Dec. 23, 1958     L. R. PEASLEE ET AL     2,866,145
ERROR SIGNAL DEVELOPING MEANS FOR POSITION
PROGRAMMING CONTROL SYSTEM
Filed Dec. 11, 1956     3 Sheets-Sheet 1

INVENTORS:
LAWRENCE R. PEASLEE,
MURRAY ROSENBLATT,
LEROY U.C. KELLING,

BY *Melvin M. Goldenberg*
THEIR ATTORNEY.

Dec. 23, 1958   L. R. PEASLEE ET AL   2,866,145
ERROR SIGNAL DEVELOPING MEANS FOR POSITION
PROGRAMMING CONTROL SYSTEM
Filed Dec. 11, 1956   3 Sheets-Sheet 2
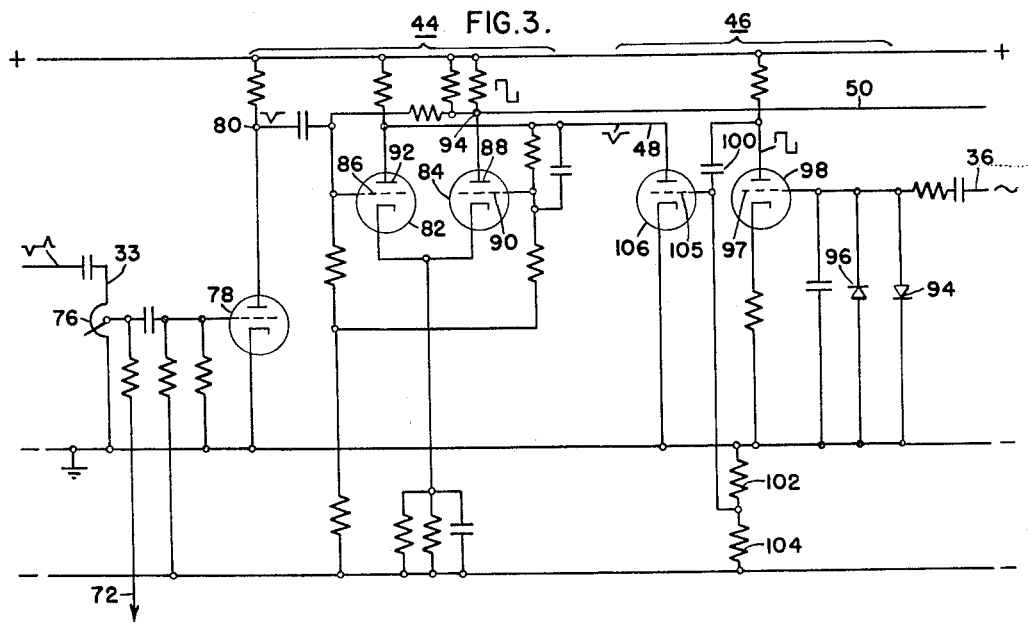
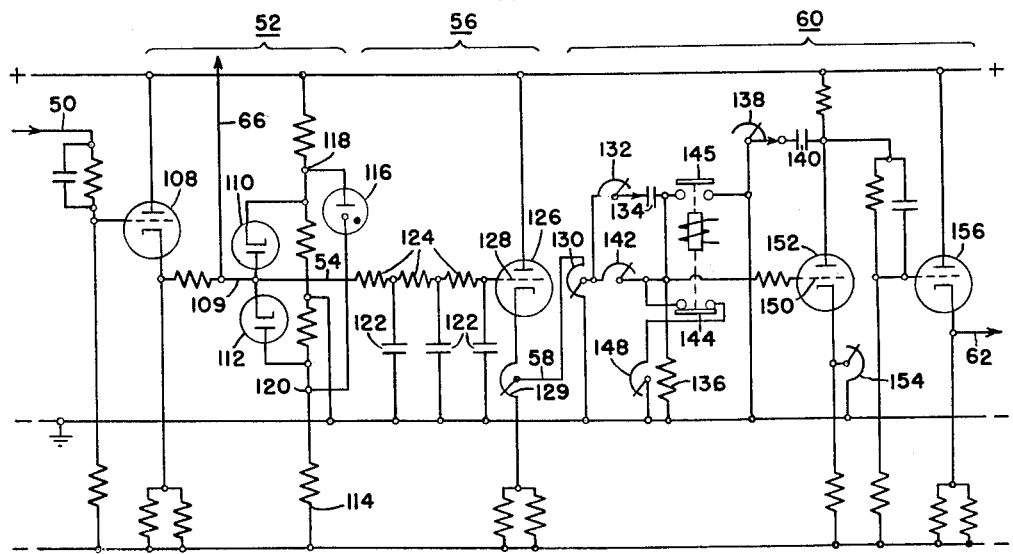
INVENTORS:
LAWRENCE R. PEASLEE,
MURRAY ROSENBLATT,
LEROY U. C. KELLING,
BY *Melvin M. Goldenberg*
THEIR ATTORNEY.

United States Patent Office 2,866,145
Patented Dec. 23, 1958

2,866,145

ERROR SIGNAL DEVELOPING MEANS FOR POSITION PROGRAMMING CONTROL SYSTEM

Lawrence R. Peaslee, Murray Rosenblatt, and Leroy U. C. Kelling, Waynesboro, Va., assignors to General Electric Company, a corporation of New York Application December 11, 1956, Serial No. 627,670

7 Claims. (Cl. 318—162)

This invention relates to improvements in programmed position control systems, more particularly, to improvements in means provided in such systems for providing position controlling or error signals developed by comparison of signals indicative of the programmed position and signals indicative of the actual position of a device being controlled.

Systems of this character are disclosed in the patent to Livingston et al., Serial Number 2,537,770 and in the co-pending applications of L. R. Peaslee, Serial Number 555,967, filed December 28, 1955, and Serial Number 627,311, filed December 10, 1956, both assigned to the same assignee as this application.

The patent and co-pending applications referred to above disclose systems wherein information for controlling the position of a programmed device such as a machine tool is stored on a data storage medium and is played back through a suitable control means when it is desired to reproduce the program. These disclosures contemplate a provision of an electrical signal serving the purpose of a reference signal and a control signal for each motion which it is desired to program and means whereby these signals may be derived from the data storage device and utilized in a servo system for carrying out the program. The servo system contemplated includes means for developing an electrical signal indicative of the true position of the object being controlled and bearing a phase relationship to the reference signal. The servo means also contemplates the provision of a means for deriving a control signal from the data storage device, which control signal has a phase relationship with the reference signal as determined during the recording of the program. The signals indicative of the true position of the device being programmed and the control signal for each channel or motion which is being controlled are fed to a discriminator or other device for developing an error signal indicative of the deviation of the true position from the programmed position. Through suitable object positioning means, the error signal is supplied to the device being positioned in order that it may assume the correct or programmed position.

In practice, it may be found that due to some failure in the equipment an error or control signal may be developed of such a magnitude as to constantly move the programmed device or to otherwise completely erroneously carry out the program. Also, in some situations when initially starting up the apparatus for carrying out the program, it may be found that a position erroneously assumed at first would develop an excessive error signal which would prevent synchronization and, therefore, prevent the programs from being carried out.

Therefore, it is an object of this invention to provide a novel error signal developing means for a programmed position control system wherein in case of excessive error in the program as carried out, the system will be shut down.

It is another object of this invention to provide a novel error signal comparator means for halting the operation of a programmed position control system in case of the failure of certain components of the system.

It has been found that in control systems of the character described that due to mechanical imperfections such as backlash in gears and screws in the device being programmed that there may be a tendency of system to "hunt." Inasmuch as such imperfections are generally inherent in such mechanical devices, it is desirable to provide means in the control system in order to reduce the "hunting."

It is a still further object of this invention to provide a novel control signal developing device which includes means for minimizing "hunting" and for insuring stability of the system under conditions where backlash is present in the system.

Briefly, the objects of our invention are achieved in one embodiment by the provision of a means for effecting a comparison of error or control signals indicative of programmed position and signals indicative of actual position and developing an error signal proportional to the departure of actual position from the control position and indicative of the direction of departure. These signals after development are supplied to means to drive the program device to its actual program position. Also provided are means responsive to a component of the error signal to stop the control system and the device being programmed in the case of the failure of a component of the system or in the case of an excessive error in the system.

The subject matter which we regard as our invention is particularly pointed out and distinctly claimed in the concluding portion of this specification. Our invention, however, both as to its organization and method of operation together with further objects and advantages thereof, may best be understood by reference to the following description taken in connection with the accompanying drawing in which:

Fig. 3 is a schematic illustration of a pulse discriminator and position signal amplifying means incorporating our invention;

Fig. 4 is a schematic illustration of an error signal filtering means and amplifier incorporating our invention;

Figure 1:
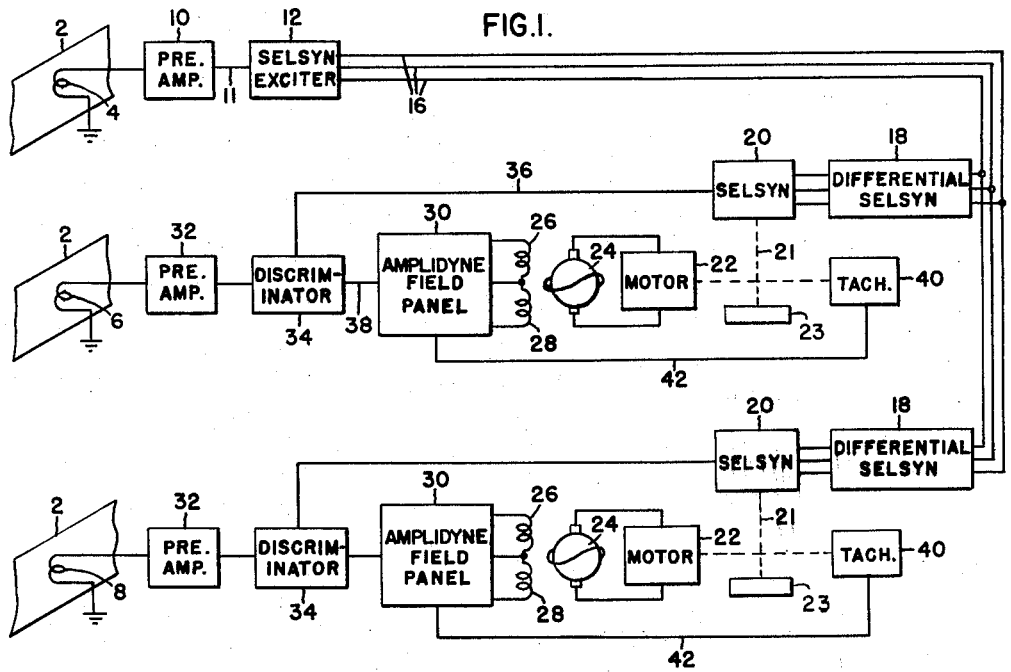
Fig. 1 is a schematic block diagram of an embodiment of the invention incorporated in a programming control system.

In Fig. 1 of the drawing, we show a programming control system similar to that disclosed in the co-pending applications of Peaslee referred to above. Since this system is described in detail in those co-pending applications, we will only briefly describe its operation here. A data storage device such as a magnetic tape 2 is provided in the illustration. This is shown as portions of three separate tapes but, in actuality, may be constituted by a single tape having a plurality of channels including the reference channel and one or more control channels recorded thereon. It should be understood that the showing in this figure is for purposes of illustration only for any suitable data storage device may be used. It should further be understood that it is possible to use our system in environments other than that illustrated in this application. Thus, if it is desired to provide a digital programming system wherein numerical values representative of the program to be followed are stored in the data storage device and which can be developed by suitable computer means into signals capable of effecting a program such as described in the patent to Livingston, et al. referred to above, a system such as disclosed in this application would have utility in an environment of this nature. Pick-up heads or other sensing devices 4 and 6 are provided to derive the reference signals and the control signals for a reference and as many control channels as desired from the storage device. Referring to the reference channel, a preamplifier 10 initially amplifies the signals derived from the storage medium. The nature of these signals described in the co-pending applications referred to may take any number of forms. After amplification by the preamplifier 10, a selsyn exciter 12 develops an output of at least two phases from the control signals. As illustrated in the drawing of this application, an output of three phases is derived via the conductors 16. Conductors 16 supply the input to a differential selsyn 18 which in turn is coupled to a position indicating selsyn 20. Position indicating selsyn 20 may be mechanically connected and is indicated by a dotted line 21 to a positioning motor 22 which may be coupled to the table and head of the machine tool being programmed by a system incorporating our invention. Alternatively, the selsyn 20 may be coupled directly to the table or head of such a machine tool. In any case, the motor 22 drives or controls an element or object in accordance with a position program. Such an element or object is shown schematically at 23 in the drawing mechanically connected to the motor 22 and selsyn 20. A motor controlled unit such as an amplidyne 24 or other power amplifier furnishes a motor control signal the direction and magnitude of which is determined by the forward and reverse windings 26 and 28 respectively provided on an amplidyne field panel 30. While the illustration is directed to essentially an electronic and electrical positioning system, it should be understood that mechanical systems such as those of hydraulic nature may be used with the error signal controlled valves in conjunction with suitable hydraulic positioning means.

Control signals having predetermined phase relationships with reference signals as determined during the recording or setting up of the program are derived by the pick-up head 6 from the data storage device and amplified by a suitable pre-amplifier 32. A discriminator 34 receives the amplified control signals and the signal from the selsyn 20 which selsyn signal has a phase relationship with the reference signals indicative of the true position of the object being controlled. The actual position signal is coupled via conductor 36 to the discriminator 34. The discriminator develops an error signal which is related to a departure of the phase relationship of the selsyn 20 to the reference signals from the predetermined phase relationship of the control signals to the reference signals and couples it via a conductor 38 to the amplidyne field panel 30. A tachometer 40 is mechanically connected to the positioning motor 22 and furnishes a velocity stabilizing signal via a conductor 42 to the amplidyne field panel 30.

Figure 2:
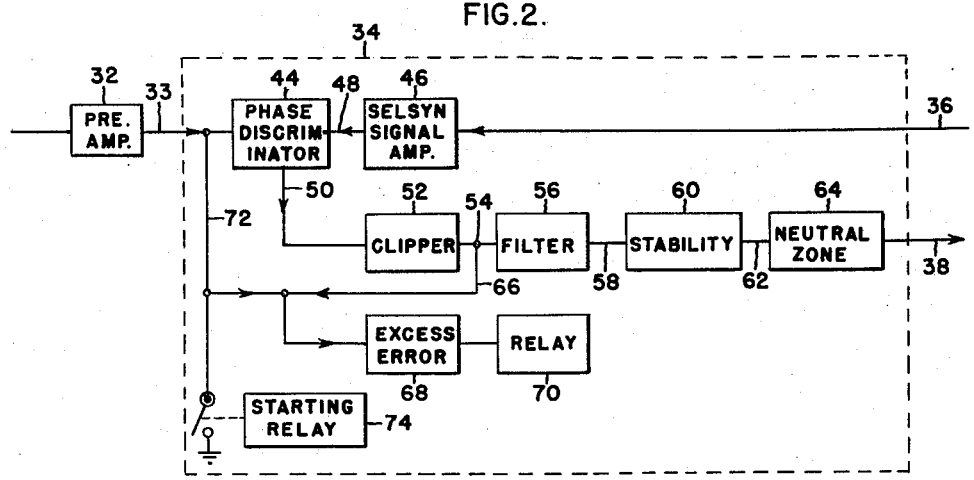
Fig. 2 is a schematic block diagram of an improved error signal developing means embodying our invention.

In accordance with our invention, we illustrate in Fig. 2 a discriminator or error signal developing means having an application in systems of the character described. The pre-amplifier 32 supplies signals derived from the data storage device to the discriminator device 34. The signals are supplied in the discriminator device to a phase or pulse discriminator 44 which also receives signals via the conductor 36 from the position indicating selsyn 20 via a selsyn signal amplifier 46 and a conductor 48. An error signal having the character to be described in greater detail hereinafter is supplied via the conductor 50 to a clipper 52. From thence it is coupled via the conductor 54 to a filter device 56. After filtering, the error signal is coupled by means of a conductor 58 to a stability network 60, then by a conductor 62 to a device 64 providing a deadband or neutral zone in the manner and for a purpose to be described hereinafter. The error signal is then supplied via the conductor 38 to the amplidyne field panel 30 to control the position of the program device in the manner described in the co-pending applications referred to above.

Our invention also contemplates the provision of a means whereby if an excessive error occurs by virtue of a component failure or recorded program calling for speeds or accelerations greater than the servo can follow or inaccurate positioning of the device being programmed, a component of the error signal is derived after limiting by the clipper 52 via the conductor 66 and supplied to an excess error device 68. The excess error device operates a relay 70 which is connected to a source of power supply to interrupt potential from said source in the event of excess error. Since the excess error device is effective upon the absence of the component of the error signal to halt the operation of the system, a means is provided to supply a substitute for this component when the device is initially operated and a large error signal may be present. This means is constituted by a conductor 72 which derives an alternating electrical signal from the preamplifier 32 and which is coupled to the excess error device 68 unless shunted to ground by the means of a timed relay operated switch 74. The operation of this feature will be described in greater detail hereinafter.

In Fig. 3 of the drawing, we show a pulse discriminator 44 and selsyn signal amplifier 46 which may be used in our invention. The signals from the control channel of the storage device derived by the pick-up head 6 are amplified by a preamplifier 32 and then coupled via the conductor 33 and a gain control potentiometer 76 to the control grid of a vacuum tube amplifier 78 which functions as a driver tube. The biases on the vacuum tube amplifier 78 are such that only the positive going pulses are effective since the tube is normally biased beyond cutoff. Thus, at point 80 the negative going pulses from the motion channel are available due to the phase inversion of this tube and these represent the position to which it is desired to move the device being programed. Vacuum tubes 82 and 84 are connected with a control grid 86 of the vacuum tube 82 connected to the plate 88 of the vacuum tube 84, while the control grid 90 of the vacuum tube 84 is connected to the plate 92 of the vacuum tube 82. Thus, the tubes are connected as a bi-stable multivibrator or flip-flop device and the operation is such that if the tube 82 is conducting the tube 84 is turned off and vice versa. If the tube 84 is conducting, it can be turned off by applying a negative pulse to its control grid 90. This causes its plate 88 to go positive dragging the grid 86 of the tube 82 positive and turning that section on. Similarly, applying a negative pulse to the control grid 86 of the tube 82 will turn on tube 84 and turn off the tube 82. Thus, by applying a positive pulse to the vacuum tube amplifier or driver 78, a negative pulse is supplied to the control grid 86 of the tube 82.

In order to derive pulses for the right-hand tube 84, signals obtained from the position measuring selsyn 20 are derived via the conductor 36. A pair of oppositely poled rectifiers 94 and 96 are coupled between the conductor 36 and the ground connection and clip the positive and negative going portions of the sine wave from the position indicating selsyn to provide a substantially rectangular wave to the control grid 97 of the vacuum tube amplifier 98. Biases may be supplied to the rectifiers 94 and 96 or advantage may be taken of the characteristics of silicon diodes which maintain a fairly high resistance until a characteristic voltage is reached at which its forward resistance drops sharply. The capacitor 100 and the resistors 102 and 104 differentiate the square-wave output of the vacuum tube amplifier 98 in order to provide signals having a pulse characteristic. The pulses from the differentiation network are supplied to the control grid 104 of a vacuum tube amplifier or driver 106, the output of which is coupled via the conductor 48 to the pulse discriminator 44. Again, only the positive pulses are effective inasmuch as the tube 106 is biased beyond cutoff.

In the operation of this portion of our invention, when the positive pulses are alternately applied to the driver tubes 78 and 106 a square wave is obtained at the point 94. If these pulses do not occur exactly 180° apart, an unbalanced rectangular wave shape is obtained. If the two pulses are less than 180° apart, the net effect is to produce an average positive voltage; but if the pulses are more than 180° apart, the net effect is to produce an average negative voltage. As explained above, the pulses supplied the driver tube 78 come from the motion channel of the data storage medium and represent the position to which it is desired that the device being controlled be driven. The pulses on the driver tube 106 are obtained from the position measuring selsyn. Thus, the signal at point 94 when balanced indicates that the device being programmed is positioned exactly as called for by the motion channel on the data storage device. A deviation from this balanced square-wave signal or true position is represented by an average positive or negative voltage which is indicative of the degree of displacement from the true position and the direction of that displacement. This error signal is supplied via the conductor 50 to the clipping means 52.

Referring to Fig. 4, before the error signal obtained at 94 can be used to control the device being programed, it must be filtered to obtain the D. C. component. The square wave is coupled to a vacuum tube 108 which is connected as a cathode follower and then via conductor 109 to which is coupled a pair of oppositely poled diodes 110 and 112. The diodes have their other electrodes coupled to a conductor 114 which is connected between sources of positive and negative potential. A reference tube 116 is coupled to a conductor 114 and holds the voltage on the cathode of diode 110 and on the anode of diode 112 to predetermined amounts. Diode 110 is normally not conducting until the voltage on its anode exceeds the voltage at point 118. At that point, diode 110 conducts limiting the voltage on conductor 109 to the voltage existing at point 118. Similarly, when the voltage at 109 tries to swing more negative than the voltage at point 120, the diode 112 conducts limiting the voltage of 109 to the voltage of 120. Thus, this stage causes the peak to peak swing of the square waves to be limited to the voltage of tube 116. The square wave is then fed through the filter 56 consisting of the capacitors 122 and resistors 124 to a vacuum tube 126 which is connected as a cathode follower for impedance matching purposes. This filter filters out the alternating component of the square-wave signal and leaves only the D. C. components at a control grid 128 of the cathode follower 126.

The output of the cathode follower 126 is derived through a balancing potentiometer 128 and fed to a stability network 60. The stability network includes a gain potentiometer 130, a lead limit rheostat 132 and lead time capacitor 134, the lag limit resistor 136, a lag potentiometer 138 and lag time capacitor 140, a lead potentiometer 142 and a synchronizing velocity potentiometer 148 which is selectively coupled to a stability network through the switches 144 and 145 controlled by the synchronizing relay 146. This network acts to maintain the gain of the system at optimum values over a wide band of frequencies, the lag portion of the network increasing the gain at low frequencies and the lead portion increasing the gain at high frequencies, thus insuring stability by eliminating hunting. If desired, capacitors of different values may be provided for the lead time capacitor 134 and lag time capacitor 140 along with suitable switch means to provide for selective lag and lead times. The signal from the stability network is fed to the control grid 150 of the vacuum tube 152 which functions as an amplifier having a bias imposed on the cathode thereof by means of a potentiometer 154. After amplification, the error signal is coupled to the electron tube 156 which is connected as a cathode follower and the output is derived via the conductor 62.

Figure 5:
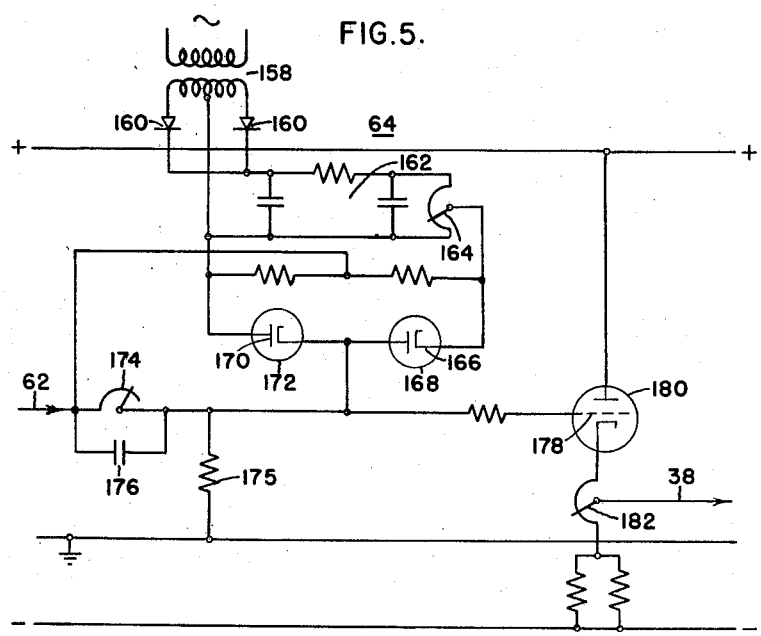
Fig. 5 is a schematic illustration of an error signal limiting means usable in our invention.

The signal from the conductor 62 is then fed to a neutral zone device which has the function of knocking down the gain of the over-all system to a very low value for differentials of position of the device being programmed, such as a machine tool, from the program positions which are less than the inherent errors in the programmed device, such as backlash in a machine tool. If this is not done when the machine tool is being programmed parallel to the axis of machine, the cutter will tend to wander back and forth across the deadband. Referring to Fig. 5, in order to provide the voltage for the neutral zone or deadband, a transformer 158 has its primary coupled to a source of alternating potential. Its secondary provides an alternating voltage which is rectified by the diodes 160 and filtered by the network 162. The amount of neutral zone voltage is determined by means of a potentiometer 164 which supplies a bias to the cathode 166 of a diode 168 and to the anode 170 of the diode 172. Thus, unless the error signal exceeds a predetermined amount as established by the biases on the diodes 168 and 172, it will not be passed on to the control device. In order to provide a lower limit for the decrease in system gain provided by the neutral zone device 64, we provide an adjustable resistor 174 which bypasses the neutral zone to a load resistor 175. Also provided is a capacitor 176 of such a value to pass error signals of higher frequencies and to thereby increase the stability of the system by providing a compensating phase shift in the error signal at such frequencies. It has been found that if a minimum gain in the error signal is not present, the relationship of input to the device, the motion of which is being controlled, and its actual motion (or output) is such that there is no effective control. Likewise, for higher frequency inputs the phase relation of the output reduces the effective control signal. The signal passed by the neutral zone device 64 is supplied to the grid 178 of the electron tube 180 connected as a cathode follower and derived via a balancing potentiometer 182 and conductor 38.

Thus, the over-all operation of our device is as follows. A control signal is derived by the pick-up device 6 from a control channel on the data storage medium. After amplification of the preamplifier 32, the signal is coupled to the pulse discriminator 44. A position indicating signal is derived from the position selsyn 20 via the conductor 36 and also coupled to the pulse discriminator 44 by means of a selsyn signal amplifier which converts the sinusoidal output of the selsyn to pulses usable in the pulse discriminator. If the signal supplied to the pulse discriminator is exactly 180° out of phase, a square-wave alternating signal having an average zero D. C. voltage value will be furnished to the control system via the clipper 52, filter 56, stability network 60 and neutral zone device 64. If the pulses from the control channel and positioning selsyn are either more or less than 180° out of phase with each other, a D. C. signal will be available from an unbalanced square-wave alternating electrical error signal which will have either a positive or negative D. C. value depending on whether or not the pulses are more or less than 180° out of phase. This signal will be filtered by 56 and stability established by the network 60 and, if it exceeds a predetermined amount as determined by the setting of the neutral zone voltage, potentiometer 164 will be supplied via the cathode follower 180 to a control device such as the amplidyne field panel illustrated.

Figure 6:
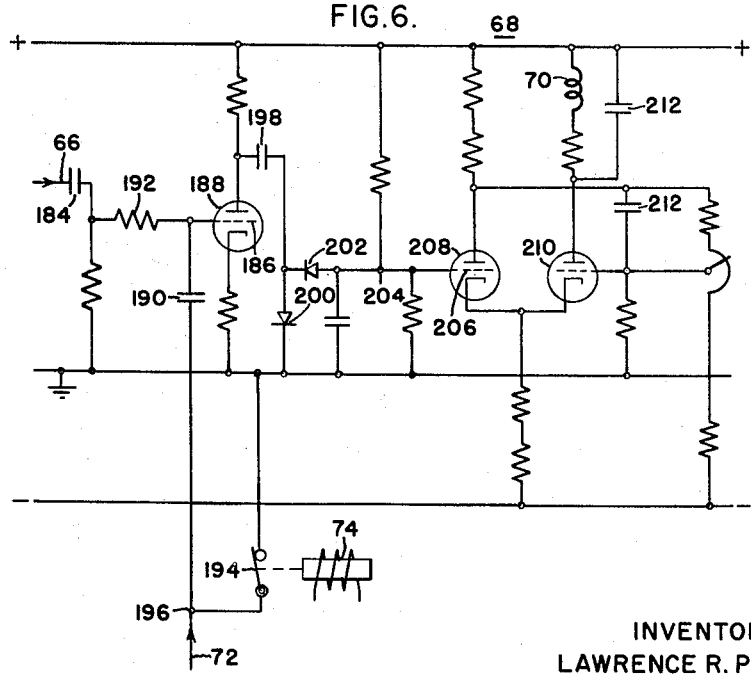
Fig. 6 is a schematic illustration of a means responsive to excess error in the error signal for interrupting the operation of the device.

In Fig. 6 of the drawing, we disclose a means for halting the operation of the device in case of excess error. The output of the pulse discriminator is normally a signal having a rectangular wave shape having a D. C. component which is a measure of the differential between the programmed and the actual position of the device being controlled. In addition to this, however, there will be an A. C. or an alternating component of this voltage. The A. C. component of the error signal is derived via the conductor 66 and coupled through the capacitor 184 to the control grid 186 of the vacuum tube 188. Resistor 192 and capacitor 190, in cooperation with the capacitor, act to develop an A. C. signal in which the peak to peak value is a measure of the alternating component of the error signal. Values of these components must be selected in order that when the error signal is in a greatly unbalanced condition, the peak to peak component of the voltage on the grid 186 changes rapidly with changes in error. Tube 188 amplifies the A. C. voltage and it is coupled through a capacitor 198 to the rectifiers 200 and 202 so that the voltage at point 204 is a measure of the peak to peak voltage of the shaped A. C. signal. The signal is then supplied to the control grid 206 of a vacuum tube 208 which is biased so that it is normally conducting while a tube 210 is normally turned off. When there is an A. C. signal on the control grid of the tube 188, negative voltage is present at the control grid 206 of the tube 208 and this holds this tube turned off, and this in turn maintains the tube 210 in an on condition. Thus, with normal signals the tube 208 is off and the tube 210 is on and the relay 70 is picked up. However, if for any reason the A. C. signal on the control grid 186 is not present or falls below a predetermined value, then the tube 208 turns on and the tube 210 is turned off. This drops out the relay 70 which opens the source of supply for the control system and for the device being programmed if desired. Capacitor 212 is provided to hold tube 210 off for a long enough period of time to de-energize the relay 70 even though the tube 208 is turned off only for short instants of time. A capacitor 213 is provided to smooth the dropout of the relay 70.

Several things can cause the A. C. signal to be lost. In case pulses are not received from the tape, it will be lost due to the fact that the pulse discriminator would always be turned either completely on or completely off and the voltage from the pulse discriminator would, therefore, be a pure D. C. signal. In the case of any tube in the preamplifier or in the pulse discriminator failing, the same thing happens. Furthermore, if excessive error is obtained, the A. C. component becomes small enough so that the relay 70 will be de-energized.

On initial start-ups of the system, it is possible that for a short instant of time an excess error signal will be received until the positioning means drive the programmed device to a correct position. Since it is not desirable to interrupt the operation of the system at this point, we provide an A. C. signal to the grid 186 of the tube 188. This is provided for by the time delay relay 74 which will be initially opened for predetermined times so that pulse signals are provided through the capacitor 190 to the control grid and the system will insure that the relay 70 is not de-energized so it will, therefore, be able to start.

Although in accordance with provisions of the patent statutes this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What we claim as new and desire by Letters Patent of the United States is:

1. In a position control system the improvement comprising means for developing an electrical signal indicative of a position assumed by an object being controlled, a source of control electrical signals, comparator means for developing an error signal indicative of the phase relationship of said position indicating signals and said control signals, said error signal having a large alternating current component when said position indicating signal and said reference have a phase relationship indicating proper position of the object being controlled and means including an electron valve device responsive to a small alternating current component of said error signal to interrupt energization of the position control system and actuation of the object being controlled.

2. In a programmed position control system the improvement comprising a source of reference signals, means electrically connected to said source and to an object being positioned for developing a position indicating signal having a varying phase relationship with said reference signal, a source of control signals having a predetermined phase relationship with said reference signals, means for comparing the phase relationships of said control signals and said position indicating signal and developing an error signal responsive to said phase relationships, and means responsive to a component of said error signal when said phase relationship exceeds a predetermined quantity to interrupt energization of the position control system and actuation of the object being programmed thereby.

3. In a programmed position control system wherein a reference channel and at least one control channel are stored in a data storage medium and each channel is available in the form of electrical signals having a phase relationship representative of the programmed positions, the improvement comprising a means for developing position indicating signals representative of the actual position of an object being positioned and having a varying phase relationship with reference signals derived from the reference channel, means for comparing the phase relationship of said position indicating signals and control signals derived from said at least one control channel and for developing an error signal proportional to said phase relationship, a relay interposed between a source of operating voltage and the control system and between said source and the objects being positioned, and an electronic valve coupled to said relay and to said last-mentioned means responsive to a component of said error signal for opening said relay when said error signal indicates an excessive error in the reproduction of the program.

4. In a programmed position control system wherein a reference channel and a plurality of control channels are stored in a data storage medium and information from each channel is available in the form of electrical signals having predetermined phase relationships representative of the programmed positions, the improvement comprising means for developing position indicating signals representative of the actual position of an object being positioned and having a varying phase relationship with reference signals derived from the reference channel, means for developing a square-wave alternating error signal in response to said position indicating signals and to control signals derived from a control channel, said square-wave alternating error signals having a maximum alternating current component and a minimum direct current component when said position indicating signals and said control signals are 180° out of phase with each other, a normally closed relay connected between a source of operating potential and the control system, a normally conducting electronic valve coupled to the operating coil of said relay and means responsive to an absence of the alternating current component of said error signal above a predetermined value of voltage to stop the conduction of said electron discharge device whereby said relay is opened.

5. In a programmed position control system as defined in claim 4 wherein said means responsive to the absence of the alternating current component above a predetermined value comprises a first electron discharge device having a grid coupled to the output of said square-wave alternating error signal developing means, and a second electron discharge device coupled to the output of said first electron discharge device and to said normally conducting electronic valve to interrupt conduction of said normally conducting electron discharge when the alternating current component of said error is below a predetermined value of voltage.

6. In a programmed position control system as defined in claim 4 wherein the improvement includes means for establishing a minimum reference level for said error signals, said minimum reference level being determined by a fixed error in a device carrying out the program.

7. In a programmed control system including a source of control signals, means connected to a device the motion of which is being controlled for developing signals indicative of the actual motion of said device and means for comparing said control signals and said actual motion indicating signals and developing an error signal indicative of the departure of the actual motion of said device from the programmed motion, the improvement comprising means responsive to a component indicating excessive error of the error signal to interrupt energization of said system and actuation of said device, means coupling the error signal developing means to the device and for passing only those error signals above a predetermined minimum value, a reactive device bypassing said last-mentioned means and presenting a low impedance to error signals of a relatively high frequency and an adjustable resistive path bypassing said last-mentioned means.

No references cited.